United States Patent

Shirai et al.

[11] Patent Number: 5,574,320
[45] Date of Patent: Nov. 12, 1996

[54] LOAD DRIVE CIRCUIT

[75] Inventors: Toshihito Shirai; Masayoshi Sakai; Koichi Futsuhara, all of Saitama-ken, Japan

[73] Assignee: The Nippon Signal Co., Ltd., Tokyo, Japan

[21] Appl. No.: 491,984

[22] PCT Filed: Nov. 19, 1993

[86] PCT No.: PCT/JP93/01703

§ 371 Date: Jul. 19, 1995

§ 102(e) Date: Jul. 19, 1995

[87] PCT Pub. No.: WO95/14304

PCT Pub. Date: May 26, 1995

[51] Int. Cl.$^6$ .................................................. H02H 3/00
[52] U.S. Cl. ..................... 307/131; 307/102; 307/141; 361/18; 361/86; 361/93; 361/187; 340/507; 365/226
[58] Field of Search ..................... 307/131, 102, 307/141; 361/187, 93, 86, 18; 340/507; 365/226

[56] References Cited

`U.S. PATENT DOCUMENTS

| 4,384,844 | 5/1983 | Yamamoto et al. | 431/14 |
| 4,394,605 | 7/1983 | Terazawa | 318/280 |
| 4,661,880 | 4/1987 | Futsuhara | 361/93 |
| 4,667,184 | 5/1987 | Futsuhara | 340/507 |
| 4,933,798 | 6/1990 | Widmayer et al. | 361/18 |
| 5,027,114 | 6/1991 | Kawashima et al. | 340/941 |
| 5,341,282 | 8/1994 | Brambilla et al. | 363/50 |
| 5,444,595 | 8/1995 | Ishikawa et al. | 361/86 |

FOREIGN PATENT DOCUMENTS

| 55-21410 | 6/1980 | Japan. |
| 55-32359 | 8/1980 | Japan. |
| 61-221529 | 10/1986 | Japan. |
| 62-9968 | 3/1987 | Japan. |
| 3-28009 | 4/1991 | Japan. |
| 3-276530 | 12/1991 | Japan. |
| 6-331679 | 12/1994 | Japan. |
| 93/14506 | 7/1993 | WIPO. |

OTHER PUBLICATIONS

"Realization of a Fail–Safe Train Wheel Sensor Using Electromagnetic Induction", by Koichi Futsuhara et al, IEEE Transactions on Instrumentation and Measurement, vol. 38, No. 2, Apr. 1989, pp. 421–427.

Primary Examiner—Jonathan Wysocki
Assistant Examiner—Albert W. Paladini
Attorney, Agent, or Firm—Lowe, Price, LeBlanc & Becker

[57] ABSTRACT

The invention relates to a load drive circuit which is able to detect an "on" fault of a switch element for controlling power to a load, and reliably interrupt the load current. A monitoring sensor is provided which generates an output when energy is supplied to the switch element of the switch circuit from outside the circuit, and a received signal level of the energy is a high level with the switch element "off", but does not generate an output when a received signal level of the energy is a low level with the switch element "on". Through logical processing of the output of the monitoring sensor and a load drive signal for driving the switch element, using a logical sum operating circuit and a self-hold circuit, the relay contact points can be prevented, at the time of an "on" fault of the switch element, from following the load drive signal, and from "hunting".

10 Claims, 8 Drawing Sheets

F I G. 7(A)
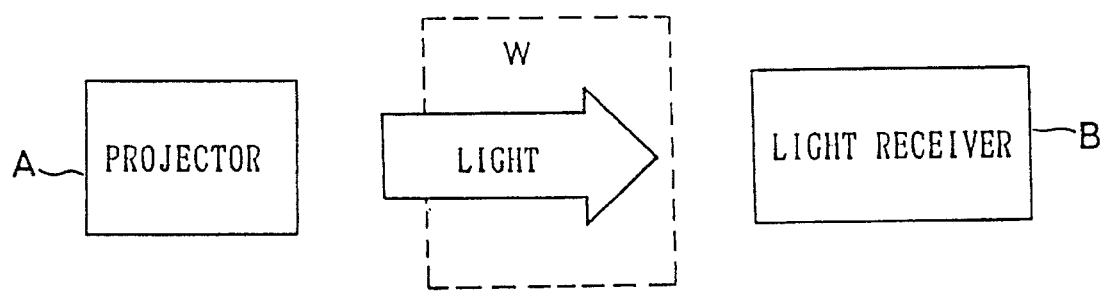
F I G. 7(B)
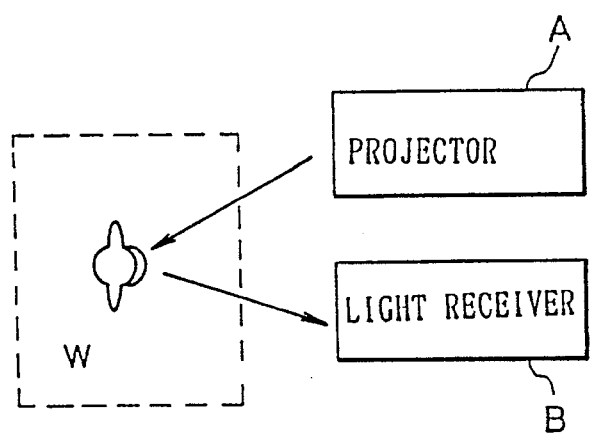

LOAD DRIVE CIRCUIT

TECHNICAL FIELD

The present invention relates to a fail safe load drive circuit which is able to forcibly interrupt a load current to a load at the time of a short circuit fault in a switch element of a switch circuit for switching the load current on and off.

BACKGROUND ART

A conventional load drive circuit which has heretofore been proposed (refer to U.S. Pat. No. 4,661,880 in the name of one of the applicants of the present invention) involves an electromagnetic relay contact, and a switch circuit using for example a semiconductor switch element, connected in series in a load feeder circuit. With this load drive circuit, power supply to the load is controlled by inputting a load drive signal to the switch circuit to switch the semiconductor switch element on and off, and if a conduction fault occurs in the semiconductor switch element, this is detected and the electromagnetic relay contacts switched off to forcibly interrupt the load current.

The structural theory of such a conventional load drive circuit is explained with reference to FIG. 9.

In FIG. 9, relay contacts 5A of an electromagnetic relay 5, and a switch circuit 4 using a semiconductor switch element such as an SSR (solid state relay), are connected in series in a load feeder circuit 3 wherein a load 2 is connected in series to a power source 1. The presence or absence of a load current $I_L$ in the load feeder circuit 3 is detected by a zero current detection sensor 7 through a current transformer 6. An output signal $I_P$ of the zero current detection sensor 7 and a load drive signal $I_N$ are input to an OR gate 8, and the contacts 5A of the electromagnetic relay 5 are driven open or closed depending on a logical sum output of the OR gate 8. The load drive signal $I_N$ is made a binary signal (logic value "1", "0") which does not err to logic value "1" at the time of a fault.

The zero current detection sensor 7, is one which gives an output signal $I_P$ of logic value "1" corresponding to a high energy condition, when a load current $I_L$ does not flow in the load feeder circuit, and gives an output signal $I_P$ of logic value "0" corresponding to a low energy condition, when a load current flows. For example the sensor 7 is constructed with a saturable magnetic body core. More specifically, a saturable magnetic body core which is respectively wound with an output lead of the current transformer 6, a primary winding for supplying an alternating current signal, and a secondary winding for receiving the signal. With this construction, when the load current $I_L$ flows in the load feeder circuit 3 of the load 2 so that a current flows in the output lead of the current transformer 6, the saturable magnetic body core becomes saturated. An alternating current signal supplied to the primary winding will therefore not be transmitted to the secondary winding side, and the output signal $I_P$ will not be produced (corresponding to logic value "0"). On the other hand, when the load current $I_L$ does not flow in the load feeder circuit 3 of the load 2 so that a current does not flow in the output lead of the current transformer 6, the saturable magnetic body core does not become saturated. An alternating current signal of the primary winding will therefore be transmitted to the secondary winding side, and the output signal $I_P$ produced (corresponding to logic value "1")

That is to say, the construction of the conventional load drive circuit is such that when a current does not flow to the load 2, or when the switch circuit 4 is switched on under normal conditions with input of the load drive signal $I_N$, (i.e. when $IP=1$, or $I_{N=}1$), the electromagnetic relay 5 is excited so that the relay contacts 5A close.

For the excitation condition of the electromagnetic relay 5 of FIG. 9, the closed ("on") and open ("off") of the relay contacts 5A is represented by a binary signal "1" and "0" respectively, with the relay contacts 5A operating under the following conditions with respect to the load drive signal $I_N$ and the load current $I_L$.

$r = I_N \lor$ inversion $I_L$ where symbol $\lor$ represents the logical sum, and $I_N$, $I_L$ and r represent the following situation:

$I_N$ = 1 input current present.
0 input current absent.
$I_L$ = 1 load current present.
0 load current absent.
r = 1 electromagnetic relay excitation condition (contacts closed)
0 electromagnetic relay non-excitation condition (contacts open)

With the binary signal described hereunder, logic value "1" indicates the presence of voltage or the presence of current, while logic value "0" is for when there is no voltage or no current.

With the above described conventional load drive circuit construction the following two problem points arise.

(1) When the load drive signal $I_N$ is not input (that is $I_N=0$), if an "on" (conduction) fault occurs in the switch element of the switch circuit 4, then a phenomena commonly known as "hunting" occurs.

This "hunting" is a phenomena wherein the relay contacts 5A repeatedly switch between "on" and "off" in the following manner.

When $I_N = 0$ and an "on" fault occurs in the switch element,

↓ the output signal of the zero current detection sensor 7 becomes $I_P = 0$.

↓

Since $I_N = 0$, the output signal of the OR gate 8 also becomes "0".

↓

The electromagnetic relay 5 thus becomes non-excitation conditions, and the relay contact 5A open.

↓

Since the load current $I_L$ stops flowing, then although the switch element has an "on" fault, the output signal of the zero current detection sensor 7 becomes $I_P = 1$.

↓

An output signal of the OR gate 8 is thus produced so that the relay contacts 5A close.

↓

-continued

The load current $I_L$ thus flows so that the output signal of the zero current detection sensor 7 becomes IP = 0.

The output signal of the OR gate 8 thus becomes 0 so that the relay contact 5A open.

The relay contacts 5A thus continue in this way to switch between "on" and "off".

(2) If an "on" fault occurs in the semiconductor switch element, the relay contacts 5A of the electromagnetic relay 5 switch between "on" and "off" in correspondence with the load drive signal $I_N$.

More specifically, with the construction of FIG. 9, when the load drive signal $I_N$ is not input, since the output signal $I_P$ of the zero current detection sensor 7 becomes IP=0 with the occurrence of an "on" fault in the semiconductor switch element, the relay contacts 5A open. However, when the load drive signal $I_N$ is input, since the output of the OR gate 8 becomes a logic value "1", the electromagnetic relay 5 becomes excited causing the relay contacts 5A to close. The relay contacts 5A of the electromagnetic relay 5 thus switch the load current $I_L$ in correspondence with the load drive signal $I_N$, instead of the semiconductor switch element.

The present invention takes into consideration the above situation, with a primary object of preventing the undesirable situation of the relay contact "hunting" when a conduction ("on") fault occurs in the switch element of the switch circuit. A secondary object is to prevent the undesirable situation of the relay contacts switching between "on" and "off" in correspondence with the load drive signal when a conduction ("on") fault occurs in the switch element of the switch circuit.

DISCLOSURE OF THE INVENTION

With the present invention, a load drive circuit comprising a series circuit of a switch circuit having a switch element which is switched on and off depending on the presence or absence of generation of a load drive signal for controlling power supply to a load, and relay contacts for forcibly interrupting the power supply to the load, connected in series with a power supply circuit for the load, is provided with a monitoring sensor for monitoring the switch circuit condition such that when energy is supplied across contacts of the switch element when the switch element is in an "off" condition, the received signal level based on the supply energy becomes a high level and an output is generated, while when the switch element is in an "on" condition, the received signal level based on the supply energy becomes a low level and an output is not generated, a first logical sum operating circuit for computing a logical sum from an output of the monitoring sensor and the load drive signal, and a first logical product operating circuit for computing a logical product from a logical sum output of the first logical sum operating circuit and the load drive signal, wherein the construction is such that a logical product output of the first logical product operating circuit is made an input signal for "on" and "off" switching of the switch element of the switch circuit, and an electromagnetic relay for driving the relay contacts is drive controlled by the logical sum output of the first logical sum circuit.

With such a construction, if an "on" fault occurs in the switch element of the switch circuit, an output is not produced from the monitoring sensor. Therefore, if the "on" fault occurs when a load drive signal is being generated, the output of the first logical sum operating circuit disappears at the point in time when the load drive signal stops, while if the "on" fault occurs when a load drive signal is not being generated, the output disappears at the point in time when the "on" fault occurs. The electromagnetic relay thus does not become excited so that the relay contacts are held open, forcibly interrupting the power supply to the load. Moreover since the electromagnetic relay is not excited while the switch element has an "on" fault, "hunting" of the relay contacts does not occur.

Furthermore, the construction may be such that the output of the first logical sum operating circuit is input to the first logical product operating circuit through an on-delay circuit.

As a result, the relay contacts can be reliably switched on before the switch element of the switch circuit comes "on".

Moreover, the construction may be such that a logical processing circuit is provided instead of the first logical sum circuit, the logical processing circuit comprising; a third logical product operating circuit for computing a logical product from the output of the monitoring sensor and the load drive signal, a second logical sum operating circuit for computing a logical sum from the output of the monitoring sensor and the load drive signal, and a self-hold circuit with the logical product output of the third logical product operating circuit as a trigger input, and the logical sum output of the second logical sum operating circuit as a reset input, which self-holds the trigger input.

As a result, in the case when an "on" fault occurs in the switch element of the switch circuit so that the output of the monitoring sensor disappears and the output of the self-hold circuit is terminated at the point in time of the fault or thereafter, then even if a load drive signal is generated after this termination, an output from the self-hold circuit will not be produced. Accordingly, the electromagnetic relay will remain in the non-excitation condition so that as well as effectively eliminating the "hunting" of the relay contacts, the "on" and "off" switching of the relay contacts in correspondence with the load drive signal can also be eliminated.

Moreover, the load drive circuit comprising a series circuit of a switch circuit having a switch element which is switched on and off depending on the presence or absence of generation of a load drive signal for controlling power supply to the load, and relay contacts for forcibly interrupting the power supply to the load, connected in series with a power supply circuit for the load, may be provided with a monitoring sensor for monitoring the switch circuit condition, the monitoring sensor comprising; a light emitting element and light receiving element arranged so as to face each other on opposite sides of mutually facing "on" and "off" switching contacts of the switch element of the switch circuit, a signal generator for supplying a high frequency signal to the light emitting element, a signal receiver connected to the light receiving element, and a fifth rectifying circuit for rectifying an output of the signal receiver, the construction being such that when the contacts of the switch element are open so that a light beam from the light emitting element is received by the light receiving element, an output is generated from the fifth rectifying circuit, while when the contacts of the switch element are closed so that the light beam from the light emitting element is obstructed by the contacts and thus not received by the light receiving element, an output is not generated from the fifth rectifying circuit, a first logical sum operating circuit for computing a logical sum from an output of the monitoring sensor and the load drive signal, and a first logical product operating circuit for computing a logical product from a logical sum output of the first logical sum operating circuit and the Load drive signal, wherein the construction is such that a logical product output of the first logical product operating circuit is made an input signal for "on" and "off" switching of the switch element of the switch circuit, and an electromagnetic relay for driving the relay contacts is drive controlled by the logical sum output of the first logical sum operating circuit.

With such a construction, a light sensor can be used in "on" fault detection of the switch element of the switch circuit.

BRIEF DESCRIPTION OF THE DRAWINGS

FIG. 7(A) is a diagram for explaining a fundamental theory for detecting safe conditions, illustrating a fail safe detection system;

FIG. 7(B) is a diagram for explaining a fundamental theory for fail-safe detection of safe conditions, illustrating a non fail-safe detection system;

BEST MODE FOR CARRYING OUT THE INVENTION

As follows is a description of embodiments of the present invention with reference to the drawings.

Figure 1:
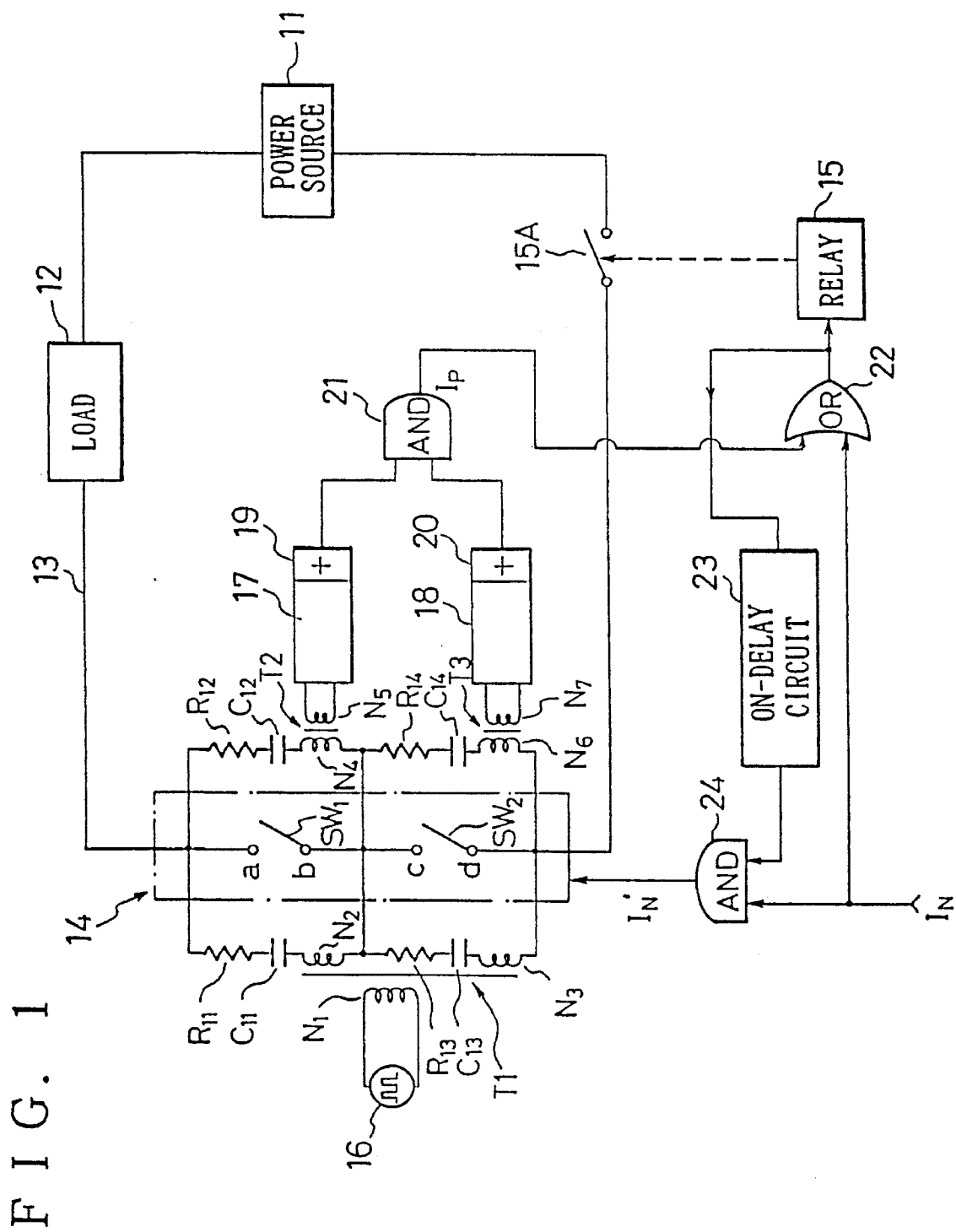
FIG. 1 is a circuit diagram illustrating a first embodiment of a load drive circuit according to the present invention.

FIG. 1 shows a first embodiment of a load drive circuit according to the present invention.

In FIG. 1 a series circuit of a switch circuit 14, and relay contacts 15A of an electromagnetic relay 15, is connected in series in a conventionally constructed load feeder circuit 13 wherein a load 12 is connected in series to a power source 11. The switch circuit 14 comprises two switches SW1, SW2 connected in series, so that when under normal conditions an input $I_N$ is input, the two switches SW1, SW2 simultaneously switch from "off" to "on". If the switches SW1, SW2 are for example transistors, then the construction may be such that the input signal $I_N$ is input commonly to two series connected transistors. Moreover, if the switches SW1, SW2 are relay contacts, they may comprise two relay contacts linked to each other in a single electromagnetic relay.

Connected in parallel across the contacts "a" and "b" of the switch SW1, are a series circuit corresponding to a first energy supply circuit, comprising a first resistor R11, a first capacitor C11, and a secondary winding N2 of a first transformer T1, and a series circuit corresponding to a first signal energy receiving circuit, comprising a second resistor R12, a second capacitor C12, and a primary winding N4 of a second transformer T2. Furthermore, the load feeder circuit 13 comprising the load 12 and the power source 11 is connected in parallel to the contacts "a" and "b" through the contacts "c" and "d". Connected in parallel across the contacts "c" and "d" of the switch SW2, are a series circuit corresponding to a second energy supply circuit, comprising a third resistor R13, a third capacitor C13, and another secondary winding N3 of the first transformer T1, and a series circuit corresponding to a second signal energy receiving circuit, comprising a fourth resistor R14, a fourth capacitor C14, and a primary winding N6 of a third transformer T3. Furthermore, the load feeder circuit 13 comprising the load 12 and the power source 11 is connected in parallel to the contacts "c" and "d" through the contacts "a" and "b". A signal generator 16 for generating a high frequency signal is connected to the primary winding N1 of the first transformer T1. Moreover, a first current sensor 17 (comprising for example an amplifier and level detection circuit) is connected to a secondary winding N5 of the second transformer T2, while a second current sensor 18 is connected to a secondary winding N7 of the third transformer T3.

Respective output signals from the first and second current sensors 17, 18 are respectively rectified by first and second rectifying circuits 19, 20 and input as DC output signals to an AND gate 21 which acts as a second logical product operating circuit. An output signal IP from the AND gate 21 is input to an OR gate 22 which acts as a first logical sum operating circuit.

A load drive signal $I_N$ is also input to the OR gate 22, and a logical output of the OR gate 22 is input to the electromagnetic relay 15. The output of the OR gate 22 is also input via an on-delay circuit 23 to an AND gate 24 which acts as a first logical product operating circuit, and into which is input the load drive signal $I_N$, so that an input signal $I_{N'}$ for the switch circuit 14 is generated by the AND gate 24.

The operation of the circuit of FIG. 1 will now be described.

When power to the circuit is switched on, then due to the high frequency signal generated by the signal generator 16, respective voltages (energy) are applied from the secondary winding N2 of the first transformer T1 to across the contacts "a" and "b" of the switch SW1 by way of the capacitor C11 and the resistor R11, and from the other secondary winding N3 of the first transformer T1 to across the contacts "c" and "d" of the switch SW2 by way of the capacitor C13 and the resistor R13.

In this condition, when there is no load drive signal $I_N$, the input signal $I_{N'}$ from the AND gate 24 is not produced so that the switches SW1, SW2 of the switch circuit 14 are in the "off" condition. In this case, since the contacts "a" and "b" of the switch SW1 and the contacts "c" and "d" of the switch SW2 are open, the respective applied voltages across the contacts "a" and "b" and across the contacts "c" and "d", are applied respectively to the series circuit comprising the resistor R12, the capacitor C12 and the primary winding N4 of the second transformer T2, and the series circuit comprising the resistor R14, the capacitor C14 and the primary winding N6 of the third transformer T3. The high frequency signal flowing in the respective series circuits is then received respectively by the first current sensor 17 and the second current sensor 18 through the medium of the second transformer T2 and the third transformer T3, and produced as a direct current output signal by the respective rectifying circuits 19, 20, and then input to the AND gate 21. Accordingly, the output signal IP from the AND gate 21 becomes a logic value "1" so that an output signal of logic value "1" is produced from the OR gate 22. The electromagnetic relay 15 is thus excited so that the relay contacts 15A close.

The output of logic value "1" from the OR gate 22 is delayed for a predetermined time delay by the on-delay circuit 23, and then input to the AND gate 24.

When the load drive signal $I_N$ is input to the AND gate 24, the input signal $I_{N'}$ ($I_{N'}=1$) is generated by the AND gate 24 so that the switches SW1, SW2 of the switch circuit 14 close. When the switches SW1, SW2 close, the high frequency signal from the signal generator 16 is short circuited by the contacts "a" and "b" and the contacts "c" and "d". The current therefore ceases to flow to the second transformer T2 and the third transformer T3 so that the respective output signals from the first and second current sensors 17, 18 becomes zero, and the output signal IP from the AND gate 21 becomes a logic value "0". However, at this time, since the load drive signal $I_N$ has already been input to the OR gate 22 as a logic value "1", the output signal of the OR gate 22 remains at a logic value "1" so that the electromagnetic relay 15 is maintained at the excited condition, and the relay contacts 15A are held closed. Moreover, the input signal $I_{N'}$ from the AND gate 24 remains at a logic value "1" so that current from the power source 11 can be supplied to the load 12.

If the load drive signal $I_N$ is cancelled, the output from the AND gate 24 becomes a logic value "0" and the input signal $I_{N'}$ for the switch circuit 14 disappears, resulting in the contacts "a" and "b" and the contacts "c" and "d" opening. As a result, an output signal is produced from the first and second current sensors 17, 18, so that the two input signals for the AND gate 21 return to the logic level of logic value "1" The output signal IP from the AND gate 21 for input to the OR gate 22 thus becomes a logic value "1" so that the electromagnetic relay 15 is maintained in the excited condition, and the relay contacts 15A remain closed.

Accordingly, if both switches SW1, SW2 of the switch circuit 14 are normal, then the relay contacts 15A remain closed, with the power supply to the load 12 controlled by "on" and "off" switching of the switches SW1, SW2 of the switch circuit 14 in correspondence with the generation/cancelling of the load drive signal $I_N$.

On the other hand, if either one of the switches SW1, SW2 of the switch circuit 14 has an "on" (condition) fault, then the output signal from the first current sensor 17 or the second current sensor 18 disappears so that the output signal IP from the AND gate 21 becomes IP =0. If the condition wherein the output signal IP of the AND gate 21 becomes zero (an "on" fault of the switch) occurs when the load drive signal $I_N$ is being generated as $I_N=1$ then while the load drive signal $I_N$ is being generated as $I_N=1$ (input signal $I_{N'}=1$) the electromagnetic relay 15 will remain excited, due to the output signal of the OR gate 22 resulting from the load drive signal being $I_N=1$. However, at the point in time when the load drive signal $I_N$ becomes $I_N=0$, the output signal of the OR gate 22 will become a logic value "0" so that the electromagnetic relay 15 becomes non-excited condition.

The relay contacts 15A thus open and power supply to the load 12 is terminated. After this, since due to the fault, the contacts "a" and "b" of the switch SW1 or the contacts "c" and "d" of the switch SW2 are closed, there will be no output signal from the corresponding current sensor so that the output signal IP of the AND gate 21 remains at logic value "0", and the relay contacts 15A will not close. Furthermore, if an "on" fault occurs when the load drive signal $I_N$ is not being generated, then the output signal from the OR gate 22 immediately disappears so that the electromagnetic relay 15 is not excited and the relay contacts 15A open to stop any power supply to the load 12. Accordingly, the "hunting" phenomena of conventional systems does not occur.

The switch circuit 14 in the circuit structure of FIG. 1 incorporates two switches SW1, SW2 which act as switches for switching the load current $I_L$ on and off in correspondence with the single input signal $I_{N'}$. The reason for two switches is so that when the contacts "a" and "b" or the contacts "c" and "d" of the respective switches SW1, SW2 are open, then the output signal of the signal generator 16 produced in the secondary windings N2 or N3 of the first transformer T1 does not flow through the load 12 and the power source 11. More specifically, with the structure of FIG. 1 when the input signal $I_{N'}$ is $I_{N'}=0$, the applied voltage across the contacts "a" and "b" of the switch SW1 is not applied to the series circuit of the load 12, the power source 11, and the relay contacts 15A, because the contacts "c" and "d" of the switch SW2 are open. Moreover, the applied voltage across the contacts "c" and "d" of the switch SW2 also is not applied to the series circuit of the load 12, the power source 11, and the relay contacts 15A because the contacts "a" and "b" of the switch SW1 are open.

The reason for having the output from the OR gate 22 input to the AND gate 24 through the on-delay circuit 23, is to take into consideration the rise delay time for the electromagnetic relay 15 to be excited and the relay contacts 15A to close, with the object of delaying the time when the output signal from the OR gate 22 is input to the AND gate 24 to longer than the rise delay time. The on-delay circuit 23, is one wherein the output signal responds instantly to a drop in the input signal, but responds with a predetermined delay time to a rise in the input signal.

In FIG.1 components such as the signal generator 16, the first and second current sensors 17, 18 and the AND gates 21, 24 are designed for use with a normal common power supply. When this power supply is switched on, if due to the provision of the on-delay circuit 23 an input signal $I_{N'}=1$ is not input to the switch circuit 14, until the relay contacts 15A close.

More specifically, when the power source for the signal generator 16, the first and second current sensors 17, 18, the AND gates 21, 24, and the OR gate 22 (including the power source for the electromagnetic relay 15) is switched on, the circuit of FIG. 1 operates in the following manner.

(a) When the load drive signal $I_N=1$ has already been input:

After switching on the power, due to the input of load drive signal $I_N=1$, the relay contacts 15A of the electromagnetic relay 15 close as a result of the output signal from the OR gate 22. A fraction later, a DC output signal is produced from the rectifying circuits 19, 20 as a result of the output signal from the first and second current sensors 17, 18, so that an output signal $I_P$ (=1) from the AND gate 21 is generated. After the relay contacts 15A close, the input signal $I_{N'}$ from the AND gate 24 is generated with a rise delay time $t_D$ which is a much longer than the rise time t for the relay contacts 15A ($t_D>t$), due to the on-delay circuit 23. The switches SW1, SW2 of the switch circuit 14 then close and the load current $I_L$ is supplied.

(b) When the load drive signal $I_{N=1}$ has not yet been input:

After switching on the power, the output signal of the first and second current sensors 17, 18 is produced, and due to the output signal IP from the AND gate 21 through the OR gate 22, the relay contacts 15A of the electromagnetic relay 15 close. After this, the output signal of the OR gate 22 is transmitted to the AND gate 24 through the on-delay circuit 23 after a delay time $t_D$ of the on-delay circuit 23 which is longer than the rise time t for the relay contacts 15A ($t_D>t$). If the load drive signal $I_{N=1}$ is then applied, then the input signal $I_{N=1}$ from the AND gate 24 is generated so that the switches SW1, SW2 of the switch circuit 14 close.

If it can be assumed that the load drive signal $I_N$ is not input immediately after switching on the power to the circuit, then it is not altogether necessary to provide the on-delay circuit 23. However to ensure a highly reliable circuit construction it is preferable to provide the on-delay circuit 23.

With the circuit of FIG.1 in the case of a disconnection occurring in the windings of the first second or third transformers T1, T2, T3, or a disconnection fault occurring in the resistors R11, R13, R12, R14, then an output signal will not be produced from the current sensor 17, or the current sensor 18, or from both. However, in the case of a short circuit fault occurring in the capacitors C11, C13, C12, C14, a current will flow from the power source 11 to the load 12 by way of the resistors connected in series to these capacitors. In this case however, since the resistance values of the resistors R11, R13, R12, R14 are markedly higher than the impedance of the load 12 there will be only a slight current, so that this will have practically no influence.

With regards to faults in the elements making up the circuit, there is a known on-delay circuit (refer to U.S. Pat. No. 4,667,184) wherein an output signal is not produced when such a fault occurs.

The circuit of the first embodiment incorporates the following features:

(i) If an "on" fault occurs in either one of the switches SW1, SW2 when the load drive signal $I_N$ is $I_{N=0}$, the output signal IP of the AND gate 21 becomes logic value "0".

(ii) A signal for examining an "on" fault between the contacts "a" and "b", and "c" and "d" of the switch circuit 14, is sent from outside the circuit. Therefore "hunting" will not occur at the time of an "on" fault of the contacts.

(iii) By use of the switches SW1 and SW2, the series circuit of the load 12, the power source 11, and the relay contacts 15A can be mutually cut off and separated. That is to say, the contacts "a" and "b" of the switch SW1 can be separated from the circuit by the switch SW2, and the contacts "c" and "d" of the switch SW2 can be separated from the circuit by the switch SW1.

(iv) By use of the on-delay circuit 23 and the AND gate 24, the input signal $I_N$ of the switch circuit 14 can be produced after the relay contacts 15A close, so that a start-up load current $I_L$ does not flow until the switches SW1 and SW2 close due to the input signal $I_{N=1}$.

A second embodiment will now be described with reference to FIG. 2.

With the first embodiment shown in FIG.1 the construction was such that an "on" fault of the switch circuit 14 was detected using two current sensors. However with the second embodiment of FIG. 2, an "on" fault of the switch circuit 14 is detected by means of a single current sensor. Structural components the same as those of the first embodiment are indicated with the same symbols.

Figure 2:
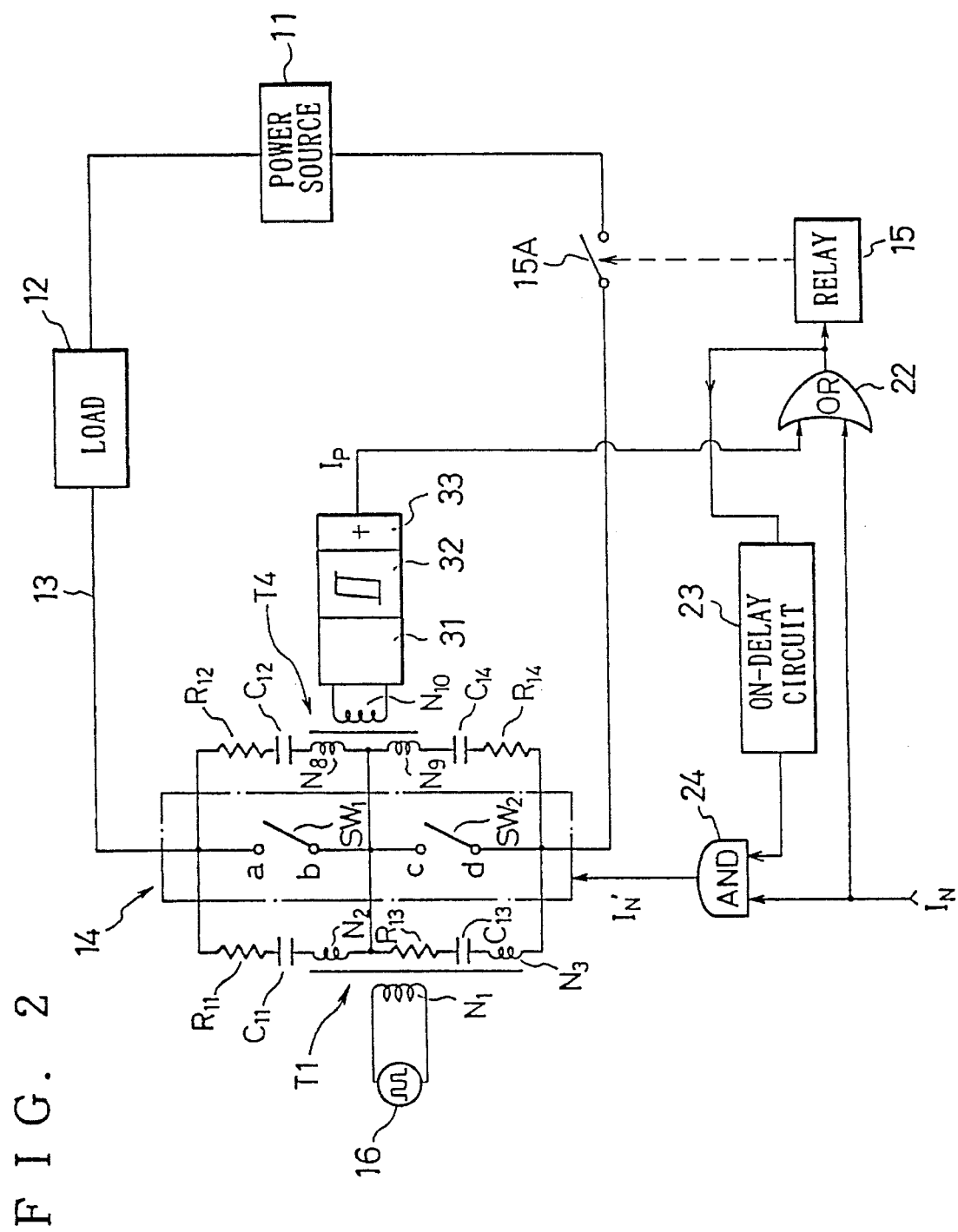
FIG. 2 is a circuit diagram illustrating a second embodiment of a load drive circuit according to the present invention.

In FIG. 2, primary windings N8 and N9, corresponding to the primary windings N4 and N6 of the second transformer T2 and the third transformer T3 of the first embodiment shown in FIG. 1 are provided as mutually separate primary windings of a single fourth transformer T4. Accordingly, a series circuit of the resistor R12, the capacitor C12 and the primary winding N8 of the fourth transformer T4, corresponds to a third signal energy receiving circuit, while a series circuit of the resistor R14, the capacitor C14 and the primary winding N9 of the fourth transformer T4, corresponds to a fourth signal energy receiving circuit. A third current sensor 31 comprising an AC amplifier is connected to a secondary winding N10 of the fourth transformer T4. The construction is such that the output of the third current sensor 31 is input to the OR gate 22 through a level detector 32 such as a Schmitt circuit, and a third rectifying circuit 33. Other details of the circuit are the same as for the circuit of the first embodiment shown in FIG. 1.

With the circuit of the second embodiment, the sum of the output signals of the secondary windings N2, N3 of the first transformer T1 resulting from the signal generator 16, is transmitted to the secondary winding N10 of the fourth transformer T4. The transmitted output level, when both the switches SW1, SW2 are open, produces a level corresponding to logic value "2", while if one or the other is open, produces a level corresponding to logic value "1", while if both are closed, produces a level corresponding to logic value "0" (zero level). Accordingly, if a threshold value level of the level detector 32 is set so that an output signal is produced at the time of a logic value "2" level, and an output is not produced at the time of a logic level lower than logic value "2", then an output signal IP (=1) from the third rectifying circuit 33 can only be generated when the switches SW1, SW2 of the switch circuit 14 are both open. Operation the same as that of the first embodiment can thus be achieved.

The construction of the current sensor may utilize a method of amplification/level detection as illustrated in U.S. Pat. No. 5,027,114, or in IEE. TRANS on INST. & MEA. Vol. 38 No. 2, APR. 1989 (Realization of a Fail-Safe Train Wheel Sensor Using Electromagnetic Induction). With these two known techniques however, both the upper limit threshold value and the lower limit threshold value are used. However, in the case of the circuit of FIG. 2, the upper limit threshold value may be set at a sufficiently high level and only the lower limit threshold value used.

A third embodiment will now be described with reference to FIG. 3. Structural components the same as those of the first embodiment of FIG. 1 are indicated by the same symbol and description is omitted.

Figure 3:
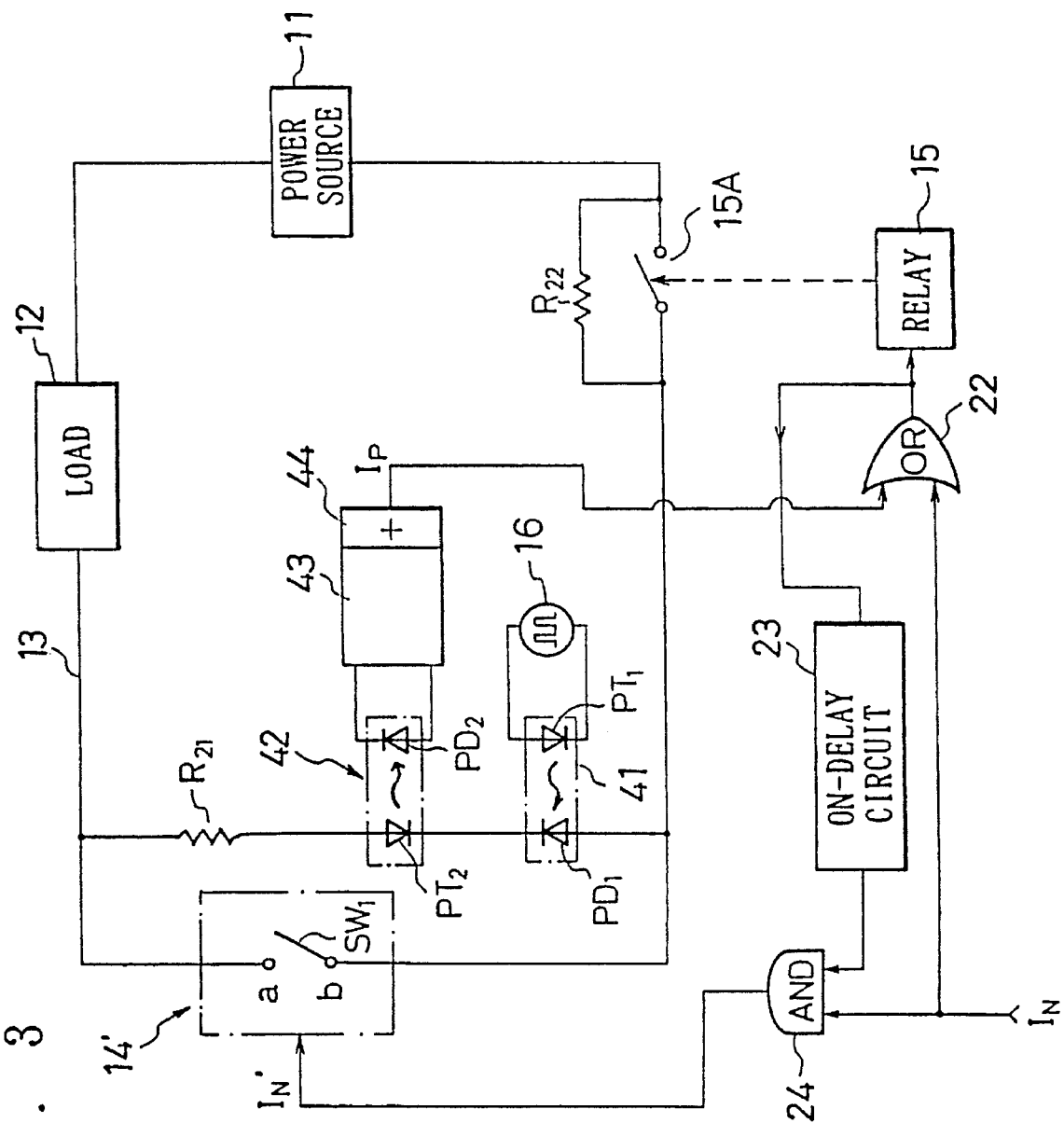
FIG. 3 is a circuit diagram illustrating a third embodiment of a load drive circuit according to the present invention.

In FIG. 3, a switch circuit 14' of the embodiment comprises a single switch SW1. A series circuit of a sixth resistor R21, a light receiving element PD1 of a first photo-coupler 41, and a light emitting element PT2 of a second photo-coupler 42 is connected to the load feeder circuit 13 in parallel with respect to the contacts "a" and "b" of the switch SW1. A voltage is supplied across the contacts "a" and "b" from the power source 11 by way of the load 12 and a fifth resistor R22 which is inserted in parallel with the relay contacts 15A. The resistance value of the resistors R21, R22 is made sufficiently high compared to the resistance value of the load 12, so that the current flowing in the resistors R21, R22 is sufficiently small compared to the load current $I_L$.

The photo-couplers 41, 42 comprise respective light emitting elements PT1, PT2 and light receiving elements PD1, PD2. The light emitting element PT1 of the photo-coupler 41 is connected to the signal generator 16, similar to that of the first embodiment, for generating a high frequency signal, while the light receiving element PD1 is connected in series with the light emitting element PT2 of the photo-coupler 42 and the resistor R21. The light receiving element PD2 of the photo-coupler 42 is connected to a fourth current sensor 43 comprising an amplifier similar to that of the first embodiment. The construction is such that an output signal from the current sensor 43 is input via a fourth rectifying circuit 44, to the OR gate 22 as an output signal IP.

The light emitting element PT1 of the photo-coupler 41 is switched by the high frequency signal generated by the signal generator 16, thereby switching the current flowing in the resistor R21. The light emitting element PT2 of the photo-coupler 42 transmits the current signal switched by the photo-coupler 41 to the light receiving element PD2 connected to the input side of the fourth current sensor 43. This transmitted signal is amplified in the fourth current sensor 43, and rectified by the rectifying circuit 44 to give an output signal IP. When the contacts "a" and "b" of the switch SW1 of the switch circuit 14' are closed, the output signal IP is at IP=0, while when the contacts "a" and "b" are open, is at IP=1.

The operation of the third embodiment will now be described.

When there is no load drive signal $I_N$, since the contacts "a" and "b" of the switch SW1 of the switch circuit 14' are open, the current flowing from the power source 11 via the load 12 and the resistors R21, R22, is switched by the signal generator 16 through the medium of the photo-coupler 41. The switched current is input to the current sensor 43 through the medium of the photo-coupler 42, and rectified in the rectifying circuit 44 so that an output signal IP (=1) is generated. Based on the output signal IP=1 the OR gate 22 excites the electromagnetic relay 15 so that the relay contacts 15A close. If a disconnection fault occurs in the resistor R21 or the resistor R22, the input signal to the current sensor 43 is not produced, so that the output signal IP of the rectifying circuit 44 for input to the OR gate 22 becomes IP=0. Also if a fault occurs in the photo-coupler 41 or 42, the output signal of the signal generator 16 will not be input to the current sensor 43, so that similarly the output signal IP becomes IP=0. The electromagnetic relay 15 thus becomes non-excited condition so that the relay contacts 15A open, opening the load feeder circuit 13 of the load 12.

When the load drive signal $I_N$ is input, since the contacts "a" and "b" close, the input signal to the current sensor 43 disappears, so that the output signal IP of the rectifying circuit 44 becomes IP=0. The relay contacts 15A however are held closed due to the load drive signal $I_N$.

If an "on" fault occurs between the contacts "a" and "b" of the switch SW1 of the switch circuit 14', then as mentioned above the output signal IP becomes IP=0, resulting in the same operation as for the before mentioned respective embodiments, so that "hunting" is prevented.

A fourth embodiment will now be described with reference to FIG. 4. Structural components the same as those of the first embodiment are indicated by the same symbols and description is omitted.

Figure 4:
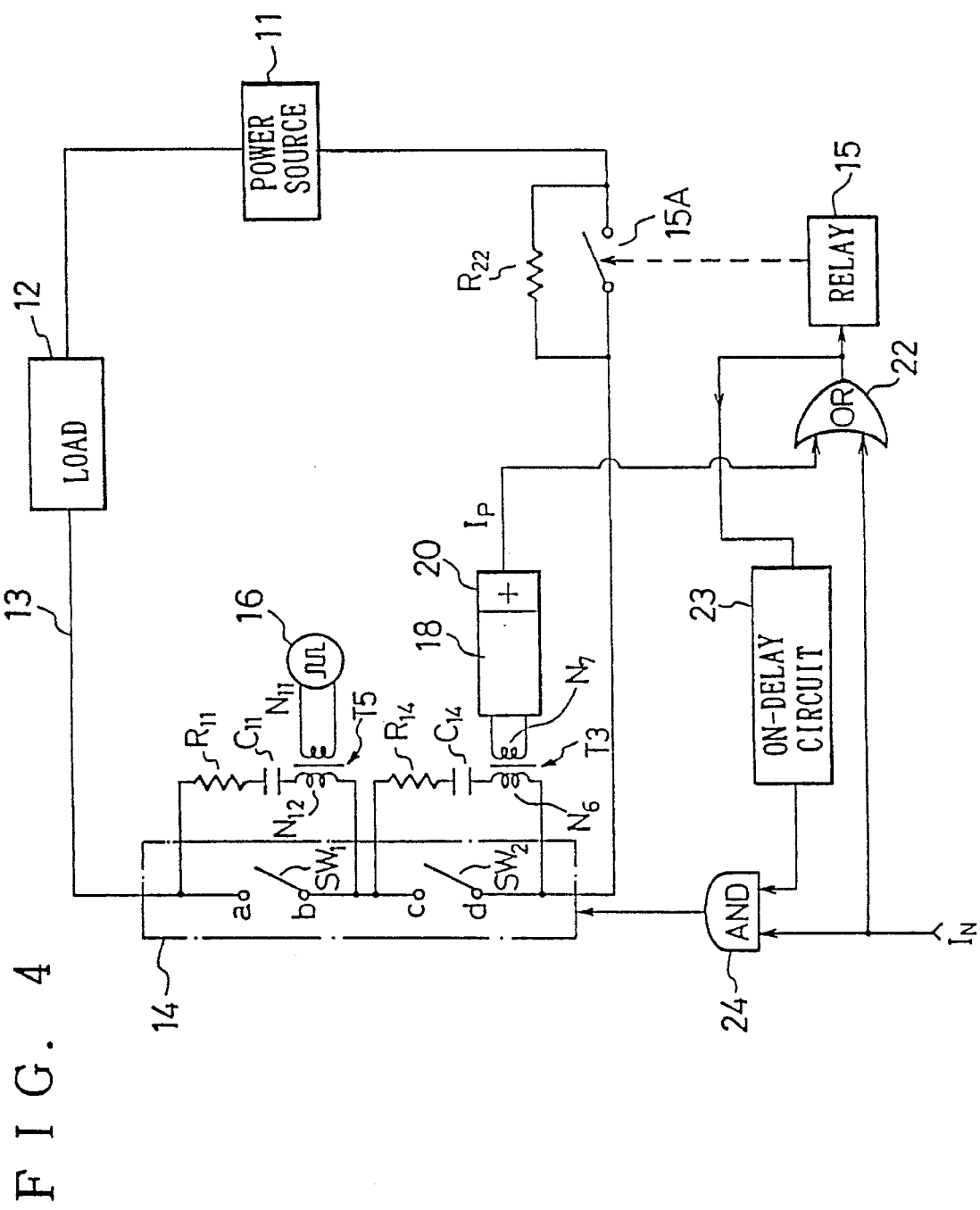
FIG. 4 is a circuit diagram illustrating a fourth embodiment of a load drive circuit according to the present invention.

With this embodiment as shown in FIG. 4, the fifth resistor R22 having a resistance value sufficiently high compared to the resistance value of the load 12 the same as in FIG. 3 is connected, in parallel with the relay contacts 15A of the electromagnetic relay 15. Moreover, as with the arrangement of FIG. 1 the resistance values of the resistors R11, R14 are also made sufficiently larger than the resistance value of the load 12. A series circuit of the resistor R11, the capacitor C11, and a secondary winding N12 of a fifth transformer T5 is connected in parallel to one of the contacts "a" and "b", or "c" and "d" of the respective switches SW1 or SW2 (with the present embodiment, to the contacts "a" and "b" of switch SW1) so that an output signal from the signal generator 16 is applied across the contacts from the secondary winding N12 of the fifth transformer T5, by way of the resistor R11 and the capacitor C11. This series circuit corresponds to a third energy supply circuit. Furthermore, a series circuit corresponding to the second signal energy receiving circuit, made up the same as that of the first embodiment, of the resistor R14, the capacitor C14 and the primary winding N6 of the third transformer T3, is connected in parallel across the other contacts "c" and "d". The construction is such that when the contacts "a" and "b" are open, a voltage signal applied across the contacts "a" and "b" of switch SW1 is supplied to across the contacts "c" and "d" of the switch SW2 via the load 12, the power source 11, and the resistor R22.

With the circuit of the fourth embodiment, when the switch SW1 is switched off, the switch SW2 is also switched off. Accordingly, when there is no load drive signal $I_N$, the voltage signal applied across the contacts "a" and "b" of the switch SW1, is also applied to the third transformer T3 via the resistor R14, and the capacitor C14. That is to say, when the input signal $I_N$ (=1) accompanying the load drive signal $I_N$, is not input to the switch circuit 14, the output signal of the secondary winding N12 of the fifth transformer T5, is produced as a current which flows in the capacitor C11, the resistor R11, the load 12, the power source 11, the resistor R22, the primary winding N6 of the third transformer T3, the capacitor C14, and the resistor R14. This current is detected by the current sensor 18 from the secondary winding N7 of the third transformer, and amplified, and then rectified by the rectifying circuit 20 to give an output signal IP (=1) which is input to the OR gate 22. In other words, the output voltage of the secondary winding N12 of the fifth transformer T5 is applied to both of the contacts "a" and "b", and "c" and "d" of the switches SW1 and SW2, and when both of the contacts are open, then an output signal IP=1 is produced. If either one of the contacts "a" and "b" or "c" and "d", or both of the contacts close, then the output signal IP becomes IP=0.

Accordingly, at the time of an "on" fault in the switches SW1 or SW2 of the switch circuit 14, then as with the before mentioned respective embodiments, there is no occurrence of "hunting".

If a disconnection fault occurs in the resistor R22, then as described below, the relay contacts 15A do not close as long as the load drive signal $I_N$ is not input.

When the relay contacts 15A are open, then since from the start a current will not flow in the primary winding N6 of the third transformer T3, the output signal IP is IP=0, so that the electromagnetic relay 15 is not excited. Moreover, when the relay contacts 15A are closed then normal operation will continue as long as an "on" fault does not occur between the contacts "a" and "b" or "c" and "d" of the switch circuit 14, so that the output signal IP is IP=1 (output voltage present). However, if an "on" fault occurs between the contacts "a" and "b" or "c" and "d" of the switches SW1 or SW2, or the condition arises wherein the power source of the signal generator 16, and the current sensor 18 is interrupted, the output of the second current sensor 18 is stopped so that the output signal IP of the second rectifying circuit 20 becomes IP=0 (no output voltage). The relay contacts 15A therefore open, and remain in the open condition. Moreover, if a disconnection fault occurs in the resistors R14, R11, then immediately the output signal IP becomes IP=0, so that the relay contacts 15A open. The circuit of the fourth embodiment, is as illustrated in Japanese Patent Application No. 5-116134.

A fifth embodiment will now be explained with reference to FIG. 5.

Figure 5:
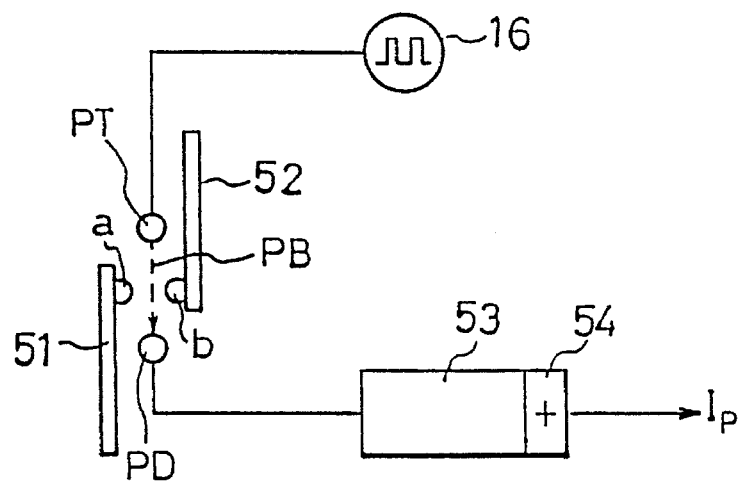
FIG. 5 is a structural diagram illustrating the main parts of a fifth embodiment of a load drive circuit according to the present invention.

In FIG. 5, a light emitting element PT and a light receiving element PD are arranged so as to face each other as a pair on opposite sides of a region between contacts "a" and "b" which are respectively provided at end portions of mutually facing arms 51, 52 which constitute a switch SW of the switch circuit 14. A high frequency signal is supplied to the light emitting element PT from a signal generator 16. A signal receiver 53 is connected to the light receiving element PD such that an output signal from the signal receiver 53 is rectified by a fifth rectifying circuit 54 to produce an output signal IP. Other circuit structure is the same as for the first embodiment shown in FIG. 1 and description and diagrams are thus omitted.

With such a construction, a light beam PB is emitted from the light emitting element PT when a high frequency signal is supplied from the signal generator 16, and this light beam PB is received by the light receiving element PD. The signal receiver 53 amplifies the alternating current signal received by the light receiving element PD, and this is then rectified by the rectifying circuit 54 to produce an output signal IP. Accordingly, when the contacts "a" and "b " are closed (when the switch SW is "on"), the light beam PB is obstructed by the contacts "a" and "b" so that the light beam PB is not received by the light receiving element PD, and the output signal IP is not produced (IP=0). When the contacts "a" and "b" are separated (when the switch SW is "off"), the light beam PB is received by the light receiving element PD so that an output signal IP is generated (IP=1). This output signal IP becomes the input signal IP to the OR gate 22 as shown in the above mentioned respective embodiments.

With this embodiment also, as with the abovementioned respective embodiments, "hunting" at the time of an "on" fault in the switch circuit can be prevented.

With the circuit structure of the abovementioned respective embodiments, while "hunting" at the time of an "on" fault in the switch circuit can be prevented, since the electromagnetic relay 15 is responsive to the input of the load drive signal $I_N$, via the OR gate 22, the relay contacts 15A open and close following the load drive signal $I_N$.

Figure 6:
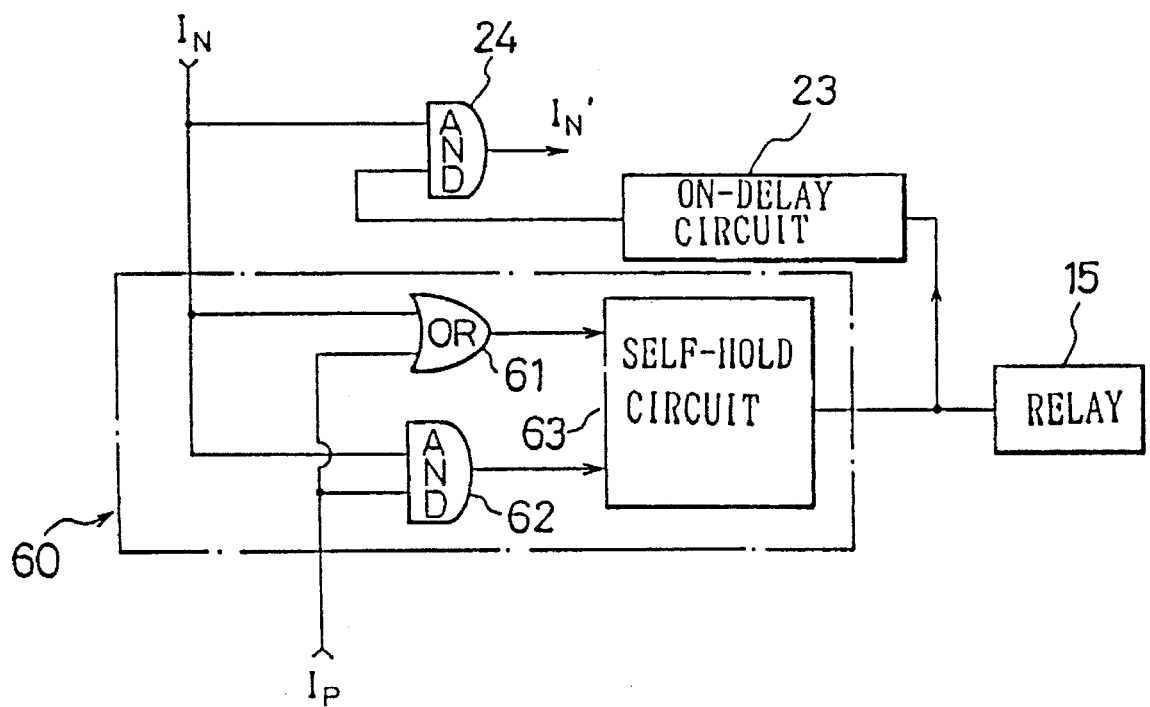
FIG. 6 is a circuit diagram of a logical processing circuit, for preventing the relay contacts from following the load drive signal in the above mentioned respective embodiments.

FIG. 6 shows a logic processing circuit for solving this problem. This circuit is provided instead of the OR gate of the beforementioned respective embodiment circuits, and has been previously disclosed in PCT/JP9 3/00048.

In FIG. 6, a logical processing circuit 60 comprises an OR gate 61 which acts as a second logical sum operating circuit, for carrying out a logical sum operation on the output signal IP, which becomes a logic value "1" when a switch of the switch circuit is open, and the load drive signal $I_N$, an AND gate 62 which acts as a third logical product operating circuit, for carrying out a logical product operation on the output signal IP and the load drive signal $I_N$, and a self-hold circuit 63 with the output signal from the OR gate 61 as a reset input signal, and the output signal from the AND gate 62 as a trigger input signal .

With the circuit of FIG. 6, the reset input signal for the self-hold circuit 63 is generated as an output signal of the logical sum operation on the load drive signal $I_N$ and the output signal IP. Accordingly, the reset input signal for the self-hold circuit 63 is produced by the input signal $I_{N=1}$ even if the output signal IP is not produced. On the other hand, the trigger input signal for the self-hold circuit 63 is generated as an output signal of the logical product operation on the load drive signal $I_N$ and the output signal IP. Accordingly, the trigger input signal is not produced if both the load drive signal $I_N$ and the output signal IP are not input.

When the logic processing circuit 60 is used in place of the OR gate 22, then when the output signal IP becomes a logic value "0" due to an "on" fault of the switch circuit under conditions wherein the load drive signal $I_{N=1}$ is being input, then while the load drive signal $I_N$ is continuing, power continues to be supplied to the load 12. However if the load drive signal $I_N$ is interrupted ($I_{N=}0$), then the output of the self-hold circuit 63 stops at the point in time of the interruption, so that the relay contacts 15A open. After this, even if a load drive signal $I_N$ is input, since the output signal IP remains at IP=0, the output of the AND gate 62 is not generated so that a trigger input signal is not input to the self-hold circuit 63, and the relay contacts 15A remain in the open condition.

When the output signal IP becomes IP=0 due to an "on" fault of the switch circuit under conditions wherein there is no load drive signal $I_N$, then after this even if a load drive signal $I_N$ is input, then similarly, the output of the AND gate 62 does not become a logic value "1" so that an output signal from the self-hold circuit 63 is not produced. Consequently, the relay contacts 15A remain in the open condition.

Accordingly, at the time of an "on" fault of the contacts of the switch circuit, the open and close switching of the relay contacts 15A following the load drive signal $I_N$ can be prevented.

With a circuit using the two switches SW1, SW2 in the switch circuit, if both the switches SW1, SW2 have an "on" fault at the same time, then as mentioned before, the relay contacts 15A open so that the load current $I_L$ is interrupted, and after this the input signal $I_{N'}$ of the switch circuit becomes $I_{N'}=0$, due to output signal IP becoming IP=0. However if one or other of the switches SW1 or SW2 has an "on" fault, then at the point in time when the output of the self-hold circuit 63 stops, even though the input signal $I_{N'}$ has become $I_{N'=}0$, the relay contacts 15A may not have yet directly interrupted the load current $I_L$. However there is no problem if the "off" response of the switch SW1 or the switch SW2 on the side wherein the "on" fault does not occur is faster than the "off" response of the relay contacts 15A. If the switches SW1, SW2 use for example transistors, then clearly, the "off" response of the transistor will be faster than that of the relay contacts 15A, so that there is no problem.

The AND gates 21, 24, and 62, the OR gates 22, and 61 and the self-hold circuit 63 in the above described circuits of the embodiments, must have a fail-safe circuit construction so that if a fault occurs in the elements which make up the circuits, an output voltage signal is not produced. Such a fail safe circuit construction is known from the previously mentioned U.S. Pat. No. 5,027,114, and U.S. Pat. No. 4,661,880. Furthermore, a fail safe circuit construction wherein at the time of a fault occurring in the elements which make up the amplifier and the rectifying circuit constituting the current sensor, the output signal remarkably drops, or becomes zero is disclosed in the abovementioned U.S. Pat. No. 5,027,114, or the beforementioned IEE. TRANS. on INST. & MEA. Vol. 38 No. 2, April 1989.

The theory of detection of a switch contact point "on" fault, occurring in the abovementioned respective circuits will now be described.

FIG. 7 illustrates the basic theory for a case wherein a safe condition is detected. FIG. 7(B) shows a region W wherein there is danger when a person has entered. This illustrates a system wherein a light beam is projected from a projector A into the danger region W, and when a person is present therein, reflected light is produced which is received by a light receiver B to thus warn of danger. With this system, if a fault occurs in the projector A so that a light beam is not produced, or due to some obstacle, the light output of the projector A is obstructed, then even if a person is in the danger region W, the light receiver B cannot receive reflected light, so that safety is indicated.

FIG. 7(A) on the other hand, illustrates a system wherein a light beam is projected from the projector A into the danger region W, and when this light beam is received by the light receiver B, safety is indicated, while when not received danger is indicated. If this system is used, then if due to a faulty projector A a light beam is not produced, or due to some obstacle the light beam is obstructed, the light beam will not be received by the light receiver B, and danger can be indicated.

Therefore, to indicate safety in the danger region W, the system of FIG. 7 (A) must be used. In FIG. 7(A) the system is such that when the danger region W is safe the light beam energy is received, while in FIG. 7(B) the system is such that when the danger region W is dangerous, a light beam is received.

Figure 8A:
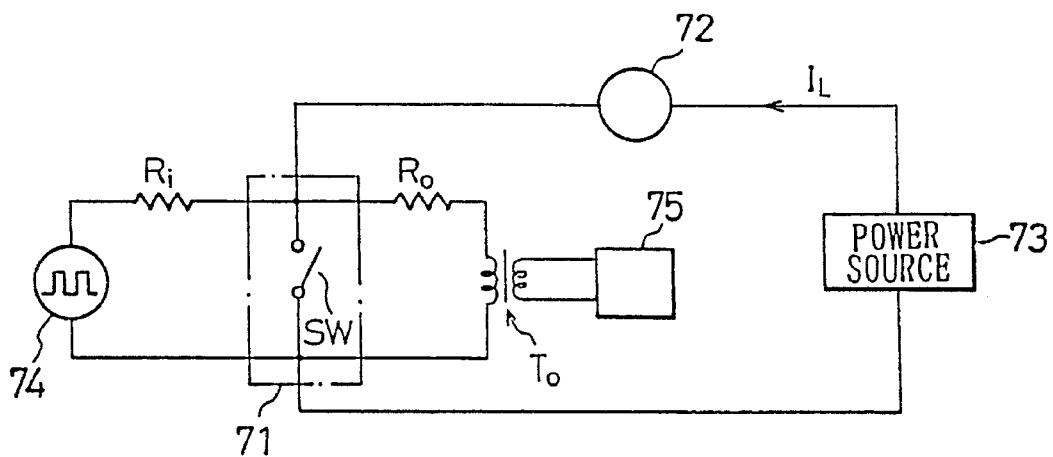
FIG. 8(A) is a diagram for explaining a fail-safe "on" fault detection system for a switch element, corresponding to the system of FIG. 7(A)

FIGS. 8(A) and (B), illustrate switch SW "on" fault detection theory corresponding to the safety indicating systems of FIGS. 7(A) and (B).

In FIG. 8, the presence of danger or safety correspond to the "on" or "off" of the switch SW. The switch circuit 71 corresponds to the danger region W in FIG. 7, such that the time when the switch SW is closed ("on") corresponds to the time when the load current $I_L$ is supplied to the load 72 (for example a motor and the like), then this has the meaning of danger. The time when the switch SW is open ("off") corresponds to the time when the load current $I_L$ is not supplied to the load 72, then this has the meaning of safety.

Accordingly, in detecting whether or not the contacts of the switch SW are safe (i.e. whether or not they are open), then energy must be received by the sensor when safe (when open). If so, then a system the same as for FIG. 7 (A) is possible. In FIG. 8, the power source 73 is one with a high output impedance.

With the circuit of FIG. 8(A), a signal voltage is sent from the signal generator 74 to the contacts of the switch SW via the resistor Ri. When the switch SW is open (when safe), the output current is received by the current sensor 75 by way of the resistor R0 and the transformer T0. When the switch SW is closed (when there is danger) the output current is not received (there is a low level). Accordingly, the detection system of FIG. 8(A) corresponds to the system of FIG. 7(A).

Figure 8B:
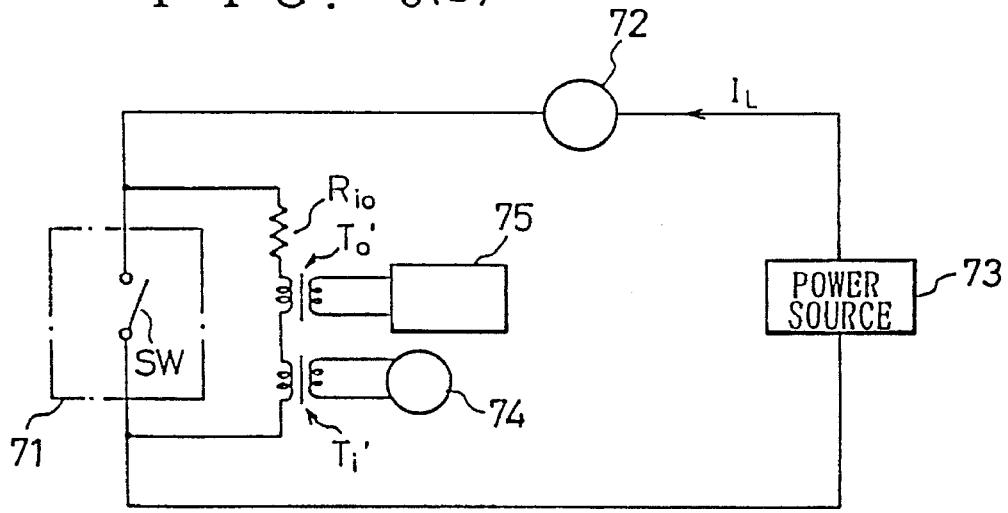
FIG. 8(B) is a diagram for explaining a non fail-safe "on" fault detection system for a switch element, corresponding to the system of FIG. 7(B)
Figure 9:
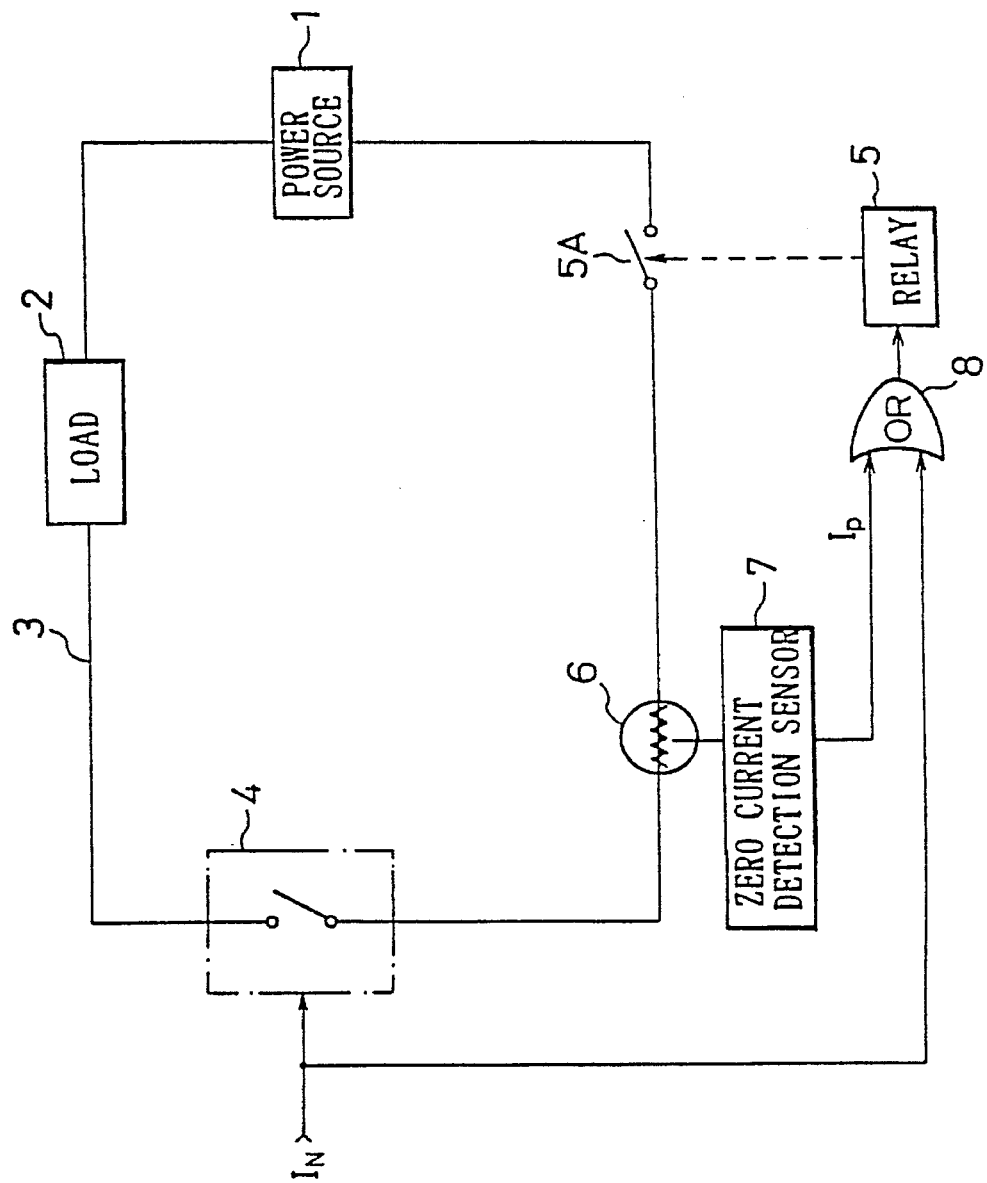
FIG. 9 is a circuit diagram for explaining the structural theory of a conventional load drive circuit.

On the other hand, with the circuit of FIG. 8(B), the output signal of the signal generator 74 is sent to the contacts of the switch SW through the transformer Ti', and the current sensor 75 detects the current flowing in the resistor Rio using the transformer To'. With the circuit structure of FIG. 8(B) when the switch SW is closed, a high level current flows in the resistor Rio, while when open, a low level current flows. Accordingly, when closed (when there is danger), the current sensor 75 receives a high level energy, while when open (when there is safety), it receives a low level energy. The detection system of FIG. 8(B) thus corresponds to the system of FIG. 7(B).

The abovementioned respective embodiments are based on the detection theory of FIG. 8(A), with energy being initially supplied across the contacts to be monitored. The construction is thus such that this energy results in a high level sensor input signal when the contacts are open (no load current flowing, hence safe), and a low level sensor input signal when the contacts are closed (load current flowing, hence danger), thus giving a fail safe detection system.

INDUSTRIAL APPLICABILITY

In a load drive circuit being a final object to be controlled in for example an industrial machine which requires a high degree of safety, if a fault occurs in a switch circuit for controlling power to the load, the power to the load can be stopped with exceptional safety. The invention therefore has considerable industrial applicability.

We claim:

1. A load drive circuit comprising:

a switch circuit having a switch element which is switched on and off in accordance with the presence or absence of an input signal for controlling a supply of power to a load, and relay contacts connected in series with said switch circuit for forcibly interrupting the supply of power to the load;

a monitoring sensor coupled to said switch circuit for monitoring the switch circuit condition such that when energy is supplied across contacts of said switch element when the switch element is in an "off" condition, the received signal level based on said supply energy becomes a high level and an output is generated, while when the switch element is in an "on" condition, the received signal level based on said supply energy becomes a low level and an output is not generated;

a first logical sum operating circuit for computing a logical sum from an output of said monitoring sensor and a load drive signal; and a first logical product operating circuit for computing a logical product from a logical sum output of said first logical sum operating circuit and said load drive signal;

wherein the logical product output of said first logical product operating circuit is provided as said input signal for "on" and "off" switching of the switch element of said switch circuit, and an electromagnetic relay for driving said relay contacts is drive controlled by the logical sum output of said first logical sum circuit.

2. A load drive circuit according to claim 1, wherein said switch circuit has two switch elements connected in series to each other, and said monitoring sensor comprises a signal generator for supplying a high frequency signal to a primary winding of a first transformer, a first energy supply circuit comprising a series circuit of a first resistor, a first capacitor, and a secondary winding of said first transformer, connected in parallel across the contacts of one of the switch elements of said switch circuit, a first energy receiving circuit comprising a series circuit of a second resistor, a second capacitor, and a primary winding of a second transformer, connected in parallel across the contacts of said one of the switch elements of said switch circuit, a second energy supply circuit comprising a series circuit of a third resistor, a third capacitor, and another secondary winding of said first transformer, connected in parallel across the contacts of the other of the switch elements of said switch circuit, a second energy receiving circuit comprising a series circuit of a fourth resistor, a fourth capacitor, and a primary winding of a third transformer, connected in parallel across the contacts of said other of the switch elements of said switch circuit, a first current sensor connected to a secondary winding of the second transformer of said first energy receiving circuit, for detecting the presence or absence of a current in said first energy receiving circuit through the medium of said second transformer, and generating an output when a current is present, a second current sensor connected to the secondary winding of the third transformer of said second energy receiving circuit, for detecting the presence or absence of a current in said second energy receiving circuit through the medium of said third transformer, and generating an output when a current is present, a first rectifying circuit for rectifying an output of said first current sensor, a second rectifying circuit for rectifying an output of said second current sensor, and a second logic product operating circuit for computing a logical product of the output of said first rectifying circuit and the output of said second rectifying circuit, wherein the logical product output of said second logic product operating circuit is made the output of the monitoring sensor.

3. A load drive circuit according to claim 1, wherein said switch circuit has two switch elements connected in series to each other, and said monitoring sensor comprises a signal generator for supplying a high frequency signal to a primary winding of a first transformer, a first energy supply circuit comprising a series circuit of a first resistor, a first capacitor, and a secondary winding of said first transformer, connected in parallel across the contacts of one of the switch elements of said switch circuit, a third energy receiving circuit comprising a series circuit of a second resistor, a second capacitor, and a primary winding of a fourth transformer, connected in parallel across the contacts of said one of the switch elements of said switch circuit, a second energy supply circuit comprising a series circuit of a third resistor, a third capacitor, and another secondary winding of said first transformer, connected in parallel across the contacts of the other of the switch elements of said switch circuit, a fourth energy receiving circuit comprising a series circuit of a fourth resistor, a fourth capacitor, and another primary winding of said fourth transformer, connected in parallel across the contacts of said other of the switch elements of said switch circuit, a third current sensor connected to a secondary winding of said fourth transformer, for detecting the presence or absence of a current in said third and fourth energy receiving circuits through the medium of said fourth transformer, and giving an output of logic value "2" when a current is present in both energy receiving circuits at the same time, an output of logic value "1" when a current is present in one or other of the energy receiving circuits, and an output of logic value "0" when a current is not present in either of the energy receiving circuits at the same time, a level detector which generates an output when the output level of the third current sensor is not less than logic value "2", and a third rectifying circuit for rectifying an output of said level detector, wherein the rectified output of said third rectifying circuit is made the output of the monitoring sensor.

4. A load drive circuit according to claim 1 wherein said switch circuit has two switch elements connected in series to each other, and said monitoring sensor comprises a signal generator for supplying a high frequency signal to a primary winding of a fifth transformer, a third energy supply circuit comprising a series circuit of a first resistor, a first capacitor, and a secondary winding of said fifth transformer, connected in parallel across the contacts of one of the switch elements of said switch circuit, a second energy receiving circuit comprising a series circuit of a fourth resistor, a fourth capacitor, and a primary winding of a third transformer, connected in parallel across the contacts of the other of the switch elements of said switch circuit, a second current sensor connected to a secondary winding of said third transformer, for detecting the presence or absence of a current in said second energy receiving circuit through the medium of said third transformer, and generating an output when a current is present, a second rectifying circuit for rectifying an output of said second current sensor, and a fifth resistor connected in parallel to said relay contacts and having a resistance value sufficiently higher than the resistance value of said load, wherein the rectified output of said second rectifying circuit is made the output of the monitoring sensor.

5. A load drive circuit according to claim 1 wherein said monitoring sensor comprises a series circuit of a sixth resistor having a resistance value sufficiently higher than the resistance value of said load, a light receiving element of a first photo-coupler, and a light emitting element of a second photo-coupler connected in series, connected in parallel across the contacts of the switch element of said switch circuit, a signal generator for supplying a high frequency signal to a light emitting element side of said first photo-coupler, a fourth current sensor connected to a light receiving element side of said second photo-coupler for detecting the presence or absence of a current in said series circuit through the medium of said second photo-coupler, and generating an output when a current is present, a fourth rectifying circuit for rectifying an output of said fourth current sensor, and a fifth resistor connected in parallel to the relay contacts, wherein the rectified output of said fourth rectifying circuit is made the output of the monitoring sensor.

6. A load drive circuit according to claim 1 wherein the output of said first logical sum operating circuit is input to said first logical product operating circuit through an on-delay circuit.

7. A load drive circuit according to claim 1 wherein a logical processing circuit is provided instead of said first logical sum operating circuit, said logical processing circuit comprising a third logical product operating circuit for computing a logical product from the output of the monitoring sensor and the load drive signal, a second logical sum operating circuit for computing a logical sum from the output of the monitoring sensor and the load drive signal, and a self-hold circuit with the logical product output of the third logical product operating circuit as a trigger input, and the logical sum output of the second logical sum operating circuit as a reset input, which self-holds the trigger input.

8. A load drive circuit comprising:
  a switch circuit having a switch element which is switched on and off in accordance with the presence or absence of an input signal for controlling a supply of power to a load, and relay contacts connected in series with said switch circuit for forcibly interrupting the supply of power to the load;
  a monitoring sensor coupled to said switch circuit for monitoring the switch circuit condition, said monitoring sensor comprising,
  a light emitting element and light receiving element arranged so as to face each other on opposite sides of mutually facing "on " and "off" switching contacts of the switch element of said switch circuit,
  a signal generator for supplying a high frequency signal to said light emitting element,
  a signal receiver connected to said light receiving element, and
  a rectifying circuit for rectifying an output of said signal receiver,
  wherein when the contacts of said switch element are open so that a light beam from the light emitting element is received by the light receiving element, an output is generated for said rectifying circuit, while when the contacts of said switch element are closed so that the light beam from the light emitting element is obstructed by the contacts and thus not received by the light receiving element, an output is not generated from said rectifying circuit;

a first logical sum operating circuit for computing a logical sum from an output of said monitoring sensor and a load drive signal; and a first logical product operating circuit for computing a logical product from a logical sum output of said first logical sum operating circuit and said load drive signal;

wherein the logical product output of said first logical product operating circuit is provided as said input signal for "on" and "off" switching of the switch element of said switch circuit, and an electromagnetic relay for driving said relay contacts is drive controlled by the logical sum output of said first logical sum operating circuit.

9. A load drive circuit according to claim 8, wherein the output of said first logical sum operating circuit is input to said first logical product operating circuit through an on-delay circuit.

10. A load drive circuit according to claim 8, wherein a logical processing circuit is provided instead of said first logical sum operating circuit, said logical processing circuit comprising a third logical product operating circuit for computing a logical product from the output of the monitoring sensor and the load drive signal, a second logical sum operating circuit for computing a logical sum from the output of the monitoring sensor and the load drive signal, and a self-hold circuit with the logical product output of the third logical product operating circuit as a trigger input, and the logical sum output of the second logical sum operating circuit as a reset input, which self-holds the trigger input.

* * * * *